US008095427B1

(12) United States Patent
Buxton

(10) Patent No.: US 8,095,427 B1
(45) Date of Patent: Jan. 10, 2012

(54) METHODS FOR FACILITATING AN ONLINE TRANSACTION OF A FIREARM

(76) Inventor: Brad B. Buxton, Sandy, UT (US)

( * ) Notice: Subject to any disclaimer, the term of this patent is extended or adjusted under 35 U.S.C. 154(b) by 0 days.

(21) Appl. No.: 12/830,331

(22) Filed: Jul. 4, 2010

Related U.S. Application Data

(60) Provisional application No. 61/223,018, filed on Jul. 4, 2009.

(51) Int. Cl.
*G06Q 30/00* (2006.01)
*G06F 17/30* (2006.01)
(52) U.S. Cl. ............... 705/26.25; 705/26.1; 705/26.35; 705/26.41; 705/26.61; 705/27.1
(58) Field of Classification Search .................. 705/14, 705/26, 26.1–27.2
See application file for complete search history.

(56) References Cited

U.S. PATENT DOCUMENTS

| | | | | |
|---|---|---|---|---|
| 5,406,068 A | * | 4/1995 | Nusbaum | 235/493 |
| 6,598,027 B1 | * | 7/2003 | Breen et al. | 705/26.25 |
| 2003/0130911 A1 | * | 7/2003 | Wong | 705/27 |
| 2006/0117011 A1 | * | 6/2006 | Arbel | 707/9 |
| 2006/0242060 A1 | * | 10/2006 | Boutin et al. | 705/39 |
| 2007/0136149 A1 | * | 6/2007 | Woodward et al. | 705/27 |
| 2010/0293071 A1 | * | 11/2010 | Brownell | 705/27 |

OTHER PUBLICATIONS www.jgsales.com accessed via the Internet Archive dated Jul.-Aug. 2008.*
eBound User Guide Revised Apr. 20, 2005, Gunderson Software Inc.*

* cited by examiner

*Primary Examiner* — William Allen
(74) *Attorney, Agent, or Firm* — Workman Nydegger

(57) ABSTRACT

Systems and interfaces communicate information that is necessary to facilitate online firearms transactions with improved certainty and legality. Centralized and standardized pricing indexes provide information that can be used to make educated transaction-related decisions. Firearm regulation data is used to cross-reference jurisdictional requirements and transaction location data to ensure legal compliance with the firearms transactions. Online auction data is filtered according to corresponding jurisdictional requirements as well as inventory records to limit transactions to available and legal transactions. Transaction data is generated and used by FFLs to verify transaction data and to complete the transactions that are initiated by the sellers and buyers.

20 Claims, 5 Drawing Sheets

| SELLER 150 | FFL 140 | BUYER 130 | SERVER 110 |
|---|---|---|---|
| Provide Account Data 210 | Provide Account Data 214 | Provide Account Data 212 | Obtain Account Data 216 |
| Provide/Access Firearm Data 220 | Provide/Access Firearm Data 222 | Provide/Access Firearm Data 224 | Create Account(s) 226 |
| Access/Provide FFL Data 244 | Receive Transaction Ticket Data 246 | Provide Offer Data 225 | Obtain/Update Firearms Data 228 |
| Receive Transaction Ticket Data 240 | Verify Firearm/Seller/Buyer 252 | Access/Provide FFL Data 248 | Calculate/Update Pricing Standards 230 |
| Provide Firearm and Transaction Ticket Data 242 | Take Possession and Secure/Hold Firearm 254 | Receive Transaction Ticket Data 262 | Provide/Filter Firearms Data 232 |
| | Provide Firearm with Transaction Ticket Data 260 | Receive Firearm 264 | Transmit Transaction Data and Other Data 250 |
| | | | Provide Verification Support 270 |

Auction Details

*Return to Auctions*

Kimber CDP Ultra 3"

MSRP: $1,259.95

Current price:

$985.00

Last bid received at 9:49 PM MST
6/19/2009

Highest bidder:

JAusten66
Kimber CDP Ultra 3"

This particular weapon has been inspected, is used, rated as a "9" and is secured in the vault of an FFL ready to ship within the domestic United States to an unrestricted person via an FFL.

The PDW .45 ACP features a satin and matte black finish and fixed low profile sights.

*Estimated shipping and handling charge in the USA for this product is $24.78.*
*This item is not available for shipping outside of the US.*

500

METHODS FOR FACILITATING AN ONLINE TRANSACTION OF A FIREARM

CROSS-REFERENCE TO RELATED APPLICATIONS

This application claims the benefit of U.S. Provisional Application No. 61/223,018 filed on Jul. 4, 2009.

BACKGROUND OF THE INVENTION

1. The Field of the Invention

The present invention is generally related to online commerce and, even more particularly, to systems and methods for conducting online firearms transactions.

2. The Relevant Technology

Gun ownership has always been a treasured right of Americans. This right is clearly established in the Second Amendment to the Constitution of the United States as one of the fundamental rights guaranteed to all Citizens of the United States. Second Amendment rights are necessary, according to some, to ensure a means for providing continued protection of their family and property. Firearms are also an integral tool in many recreational and hunting activities. For at least the foregoing reasons, many citizens have taken the opportunity to purchase and own a gun.

It is estimated that over 200 million guns, having a worth of over $40 Billion USD, are privately owned in United States. These guns are found in about 50 percent of all households. It is also estimated that approximately five percent of the overall U.S. population has a concealed handgun permit.

It is well established that adverse economic conditions will result in a general increase in crime. Accordingly, the current risk of an economic collapse, as well as an anticipated democratic action to limit Second Amendment rights, has fueled an unprecedented demand for guns with gun purchases occurring at historic highs and applications for permits increasing by about 400 percent over the last year.

Transactions for guns sold in this burgeoning and rapidly accelerating market occur in a variety of settings, including small retail stores, mass merchandisers, small independent retailers, pawn shops, small auctions, mail-order, and online Internet-based auction sites. Interestingly, in the gun industry, manufacturers have not yet entered the market to sell directly to retail customers.

Many Federal regulations, enforced by The United States Bureau of Alcohol and Tobacco (BATF), impose legal requirements on the purchase and sale of firearms. Any individual that is involved in the illegal sale, purchase, or transfer of firearms may violate these regulations, which is a felony punishable by imprisonment and confiscation of the firearm(s).

Two general rules apply to the majority of gun transactions. The first rule is that an instant background check must be performed on the purchaser before a gun is sold. This is done to assure that the purchaser is not a "restricted person," who, for any number of legal reasons, has lost his rights to purchase or possess a gun. The second rule is that no gun may be transported across a state boundary during the sale of the gun unless the gun is transferred through a "Federally Licensed Firearms Dealer" (FFL) on both ends of the transaction. There are currently estimated to be about 90,000 FFLs. Regulations also require the careful collection, storage, and reporting of all records associated with gun sales.

For certain specialty firearms, even more restrictive regulations apply, including requirements for special occupation tax status, tax stamps, and, in some cases, outright bans of transactions except to qualified law enforcement personnel.

Only a very limited exception exists for many of the foregoing federal regulations. This exception, which is frequently termed the gun show loophole, allows a firearm to be sold between two private parties who are not generally engaged in the business of selling firearms when the sale occurs within states boundaries and does not require an instant background check or the involvement of an FFL in the transaction.

In addition to federal regulations, each state also has its own unique set of state-level firearm regulations. State regulations vary widely, from essentially no restrictions, such as in Alaska, to significant restrictions, such as in California. Local rules enacted by townships or cities, such as those enacted by New York City, Washington, D.C., and Chicago, can further complicate this issue.

It has been estimated that more than 20,000 federal, state and local laws have been imposed on firearms in the United States. These laws represent a complex web of regulations which have continuously shifted since 1933, including as recently as January of 2009 in the form of House Bill 45.

Although the regulatory environment is extraordinarily strict, the actual go-to market sales approach for transacting firearms is comparatively disorderly and somewhat reminiscent of how business was transacted in the 1950s. For instance, the marketplace is riddled with unsophisticated transactions occurring in small stores, person-to-person sales, and other relatively loose manufacturing-to-warehouse-to-jobber-to dealer-to-retailer type selling structures which fail to derive any benefit from existing economic consolidation strategies or corresponding economies of scale. In fact, supply and demand without any market insight or intelligence at the most local of levels appears to be the "rule of the day," if any economic rules at all can be said to apply. Currently, there are no central transaction points, clearinghouses, exchanges, or other consolidated systems for firearms transactions in the marketplace.

The lack of a centralized marketplace to establish real-time firearm pricing standards and national or at least regional inventory levels has placed the firearms industry in a uniquely susceptible position in which misinformation is often used to exploit the greed and fear of both buyers and sellers. For instance, when it deceptively rumored that the government was drafting a House Bill that would impose a 500 percent tax on ammunition, it took only a couple of weeks for the price of ammunition to increase substantially, and for many types of ammunition to be sold out at gun stores throughout the country. Several months later, the drain on ammunition supplies is still significant, even though it has since been clarified that HB 45, the pending House Bill in question, was only proposing a smaller $0.05 per unit tax.

Similarly, when it was feared that a popular semi-automatic rifle would become illegal to buy due to its similarity in appearance to a military rifle, prices for that rifle dramatically increased, and virtually all available inventory for that rifle was purchased in a matter of weeks. These are but two of many examples where the lack of a centralized clearinghouse, marketplace, or exchange for firearms has allowed pricing abuses to exist in the face of rumors, fear, and poor information, and for local shortages of inventories to feed those fears, since there is no centralized verification of national real-time market prices or inventory levels.

It is clear that the prices of firearms and ammunition will fluctuate, sometimes wildly, in response to legal uncertainty and rumor mongering. It is also clear that the prices of firearms will dramatically and continuously increase in response to actual restrictions placed on firearms. For instance, laws have been enacted which restrict availability of certain types of weapons manufactured before 1986, such as the MAC 10 and MP5. Consequently, their prices have increased from about $100 each to about $25,000 and are still climbing. However, due to a lack of centralized information, actual inventory levels and prices are difficult to verify, thereby enhancing the potential for pricing abuses.

Currently, there are no existing centralized exchanges or clearinghouses for firearms that maintain databases of existing inventory levels of new and used firearms on a national or even regional basis. Instead, a purchaser is left having to speculate or at least investigate countless individual FFL and private inventories. Even Amazon and eBay, two of the larger and most popular online marketplaces, do not offer guns for sale. One reason for this is presumably due to the inherent difficulties involved in navigating the complex web of legal regulations surrounding firearms transactions as mentioned above.

One popular venue for purchasing firearms is through an auction. Some in-person auctions such as farm auctions and local liquidation type auctions are held throughout the country to satisfy this desire and to facilitate firearms transactions involving larger inventories than are typically available through local retailers. Additionally, some online auctions, such as GunsAmerica and KSL classifieds, which have also been developed for many of the same purposes, provide even greater inventory levels. One online dealer, Gunbroker.com, even boasts 100,000 guns on its website. However, the inventory levels presented by these existing providers, as well as other online sources, still remain relatively small in comparison to the actual firearms inventories that exist at FFLs and other dealers on a national or even regional level.

Existing online firearms auction suppliers also fail to provide a sufficiently safe, secure, and legal consumer environment for performing online firearms transactions in such a way as to adequately address the complexities of existing regulations. In particular, there is no provision for legally obtaining a firearm. There is no validation of identity, instant background check, or requirement for using licensed FFL dealers for interstate transactions.

Additionally, existing online auction suppliers also fail to provide any means for actually completing an entire firearm transaction. Instead, they merely loosely connect prospective buyers with prospective sellers leaving the details of the actual transaction to the parties involved and, in so doing, offer no protection against fraud or lawlessness. There is no means for financially establishing or completing a transaction, or for returning defective or incorrectly advertised merchandise. There is also no assurance that the firearms advertised may legally be sold, that the weapon actually exists, or that once the purchaser's payment is received (always up front), the firearms will be shipped or as advertised. In short, buying firearms facilitated by this uncontrolled pseudo-process is fraught with uncertainty and the risk of fraud and felony at every turn.

BRIEF SUMMARY OF THE INVENTION

The present invention is generally directed to embodiments for facilitating online transactions of firearms and, in some embodiments, for providing centralized information corresponding to inventory levels, pricing standards, and legal regulations. Processes are established for verifying and completing the entirety of the firearms transactions, in many embodiments, as well as for providing safeguards to ensure that the firearms transactions will be in compliance with federal, state and local regulations.

One benefit that can be achieved through implementation of the present invention is the creation of a safe transactional environment where consumers, sellers, buyers, and dealers may confidently engage in legal transactions that are compliant with applicable federal, state, and local laws.

Most consumers and participants in the market want to follow the law, and therefore, make only legal transactions. However, variations in the laws of different communities are complex, overwhelming, and obscure. This can make it difficult for consumers to ensure their transactions are in compliance with legal requirements. There is also a small percentage (but overall a worrisome total number) of private sellers who have little respect for compliance with the law. If a buyer were to inadvertently become entangled with such a seller, the consequences could range from loss of funds to criminal charges as an accessory to a felony.

The present invention provides means for ensuring compliance with existing laws. It can be, by design, the safest, most foolproof, efficient system, for providing and maintaining the protections consumers have come to expect in all of the other transactions they encounter outside of the firearms industry.

Another benefit that can be achieved through the present invention is that every gun that comes into the system will, by definition, be verified as a legally registered gun, thereby reducing the inventory of black and gray market guns. Additionally, every attempted illegal transaction, or stolen firearm offered to and detected by the system will be properly reported. Because of the way the system aggregates data, it will be possible to report potentially illegal flows of weapons and patterns which suggest straw purchases and other adverse trends to the authorities, while at the same time assuring the highest possible level of protection of the privacy of legal buyers, sellers, and FFLs participating in the system.

According to some embodiments, online interfaces are provided by one or more server system(s) for firearm sellers, buyers, and FFLs to facilitate the gathering and displaying of data that is useful for validating and verifying information provided by the buyers and sellers and for ensuring legal compliance during the firearms transactions.

Some seller interfaces are used to gather information about the seller which can be used, for instance, to establish a seller account. Financial institution information can also be obtained for identifying where to withdraw money for fees, or where to deposit money from completed transactions. Some seller interfaces also gather information related to the specific firearm(s) that the seller is attempting to sell, such as the firearm's type, age, or condition. Some seller interfaces are also used for providing the seller with information that can be used to facilitate the identification, pricing, and transfer of the firearm.

Some buyer interfaces gather information about the buyer for establishing a buyer account. Some buyer interfaces gather information related to the firearm(s) that the buyer is attempting to purchase. Some buyer interfaces provide the buyer with information for identifying and acquiring the firearm(s). Financial institution information can also be obtained for defining the source(s) of money to be used for the transactional purchase and any account fees.

FFL interfaces are provided for receiving data related to third party content (e.g., FFL webpages), for obtaining data related to FFL inventories, and for providing identification information used by the FFL to identify the firearm(s) being transacted, as well as other transaction data. Financial institution information can also be obtained for defining the source(s) of money to be used for fees as well as for defining deposit accounts for receiving payments of royalties or fees.

Geographic location information related to the buyers, sellers, and FFLs can also be obtained through the various interfaces to facilitate the identification of local FFLs for the corresponding buyers and sellers and to identify relevant local regulations that are applicable to the transaction for both buyers and sellers. Corresponding interfaces provide the relevant regulations or filter results to limit access to transactions and information based on the relevant regulations.

Additional interfaces provided for any combination of the FFL, seller, or buyer systems facilitate background checks and shipping and handling processes.

According to some embodiments, a seller is able to list a firearm for sale on a centralized website. This website is filtered, automatically or manually, according to geography and legal regulations so that the buyer can more easily identify the inventories of firearms that can be purchased by the buyer without running afoul of existing firearms regulations within the relevant buyer's and seller's legal jurisdictions.

A seller can also receive a ticket, or other transaction data, corresponding to a particular transaction which can be brought to an FFL along with the corresponding firearm to be held and/or inspected by the FFL until it is transported to the buyer.

A centralized listing of private and FFL firearms for sale is maintained along with pricing standards corresponding to different types of firearms according to type and condition. The pricing standards are updated, as necessary, to reflect real-world conditions. The pricing standards correspond to firearms currently in inventory as well as firearms that are not currently in inventory so that buyers, as well as sellers, are provided additional tools for making more informed decisions about their firearms transactions.

In some embodiments of the invention, a server computing system comprising a processor and memory facilitates online transactions of firearms by executing instructions stored in memory that enable a seller to sell a firearm to a buyer with the use of at least one computerized interface generated by the server. Even more particularly, the server is able to facilitate the online transactions of firearms by providing one or more interfaces to the seller through which the seller provides seller account data that is received by the server and used to generate a seller account. The server also receives firearm data corresponding to a firearm to be sold by the seller through the one or more interfaces. The server thereafter determines whether the seller is legally permitted to sell the firearm based on current firearm regulations corresponding to a jurisdiction of the seller. If permitted, the server then advertises the firearm for sale on the one or more interfaces. However, the firearm is only advertised to one or more buyers if the seller is legally permitted to sell the firearm based on a determination that the one or more buyers are legally permitted to buy the firearm, as determined by firearm regulations corresponding to one or more legal jurisdictions of the one or more buyers.

The server can also provide one or more interfaces to the buyer through which the buyer provides buyer account data for generating a buyer account. The server can also receive firearm data from the buyer corresponding to a firearm to be purchased by the buyer. The server will transform a master list of all firearms available for sale, including the firearm being sold by the seller, into a filtered list of only the firearms that are available for purchase by the buyer, which omits some of the firearms from the master list, and which is based at least in part on firearm regulations associated with one or more legal jurisdictions associated with the location of the buyer, as determined by either the buyer account data or a current GPS location of the buyer. This list is displayed to the buyer for selection of the firearm(s) the buyer wishes to purchase.

In summary, it will be noted that the server is able to create and maintain seller and buyer accounts for online firearms transactions. The server is also able to determine whether each seller is permitted to sell certain firearms, to create and update a master list of firearms available for sale, and to customize the display of the master list, as separate filtered lists that are modified for each prospective buyer to only include firearms for sale that can be legally purchased by each buyer based on the classifications of the parties and firearms involved and/or firearm restrictions of the legal jurisdictions corresponding to the addresses or current GPS locations associated with the buyer, the seller, and/or any FFL involved in the transaction.

These and other objects and features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only illustrated embodiments of the invention and are therefore not to be considered limiting of its scope. The invention will be described and explained with additional specificity and detail through the use of the accompanying drawings in which:

FIG. 2 illustrates a flowchart of elements involved in some embodiments for facilitating online firearms transactions;

FIG. 5 illustrates yet another interface embodiment for facilitating online firearms transactions.

DETAILED DESCRIPTION OF THE PREFERRED EMBODIMENTS

Figure 1:
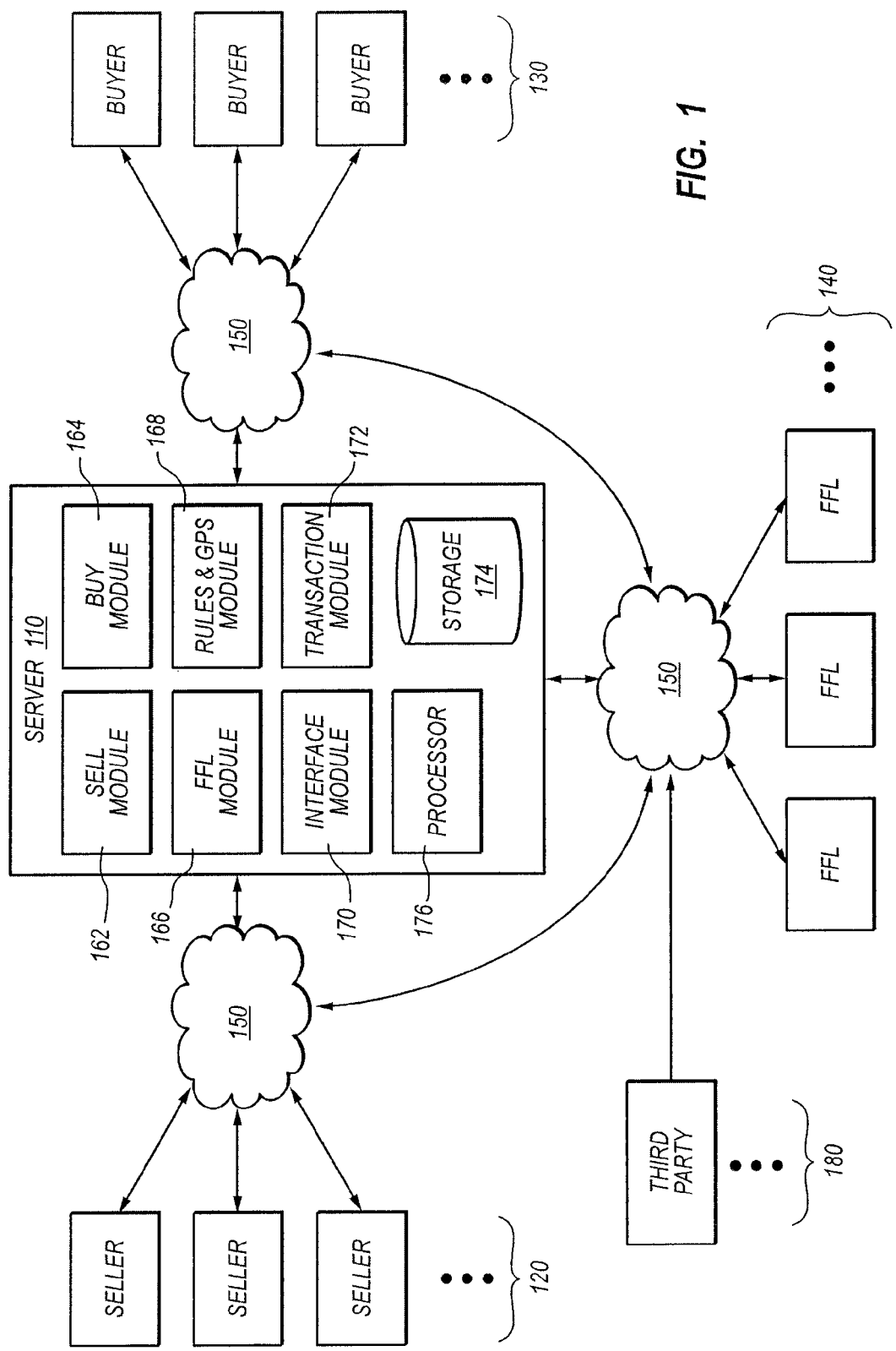
FIG. 1 illustrates one embodiment of a network for facilitating online firearms transactions.

The present invention is generally directed to embodiments for facilitating online transactions of firearms that involve any combination of buyers, sellers, or FFLs.

Various online interfaces are provided for creating accounts for firearm sellers, buyers, and FFLs, and for gathering and displaying data related to firearms transactions.

To facilitate interpretation and understanding of the Specification and Claims, various terms will now be defined.

The term "online firearms transactions" should be broadly interpreted as any firearms transaction involving the use of the Internet or any other computer network in which a firearm is sold, purchased, or shipped for the corresponding sale or purchase. This can include, for example, using the Internet or other computer network for acquiring, transmitting, generating, and/or displaying data related to a firearm, the buyer, the seller, the FFL, or any other entity involved in the transaction, such as manufacturers, transporters, or government agencies.

The term "firearm" can include any combination and configuration of guns (such as, but not limited to pistols and rifles) or other types of weapons capable of firing projectiles. Firearms, as defined herein, is also defined in some instances as the actual ammunition or other projectiles that are fired from a gun or other weapon.

In some embodiments, other weapons besides firearms can also be purchased or sold through the same mechanisms described throughout this paper in specific reference to firearms. Accordingly, it will be appreciated that although the application is written with specific reference to transactions involving firearms, the present invention also extends to systems and methods for facilitating the sale and purchase of other weapons that are not typically considered firearms, such as but not limited to knives, swords, other bladed weaponry, archery equipment, spears, martial arts weapons, chemical sprays and other chemical weapons, fire generating weapons, acoustic weapons, as well as any other type of weapons. Therefore, all embodiments referring to firearms, as described herein, should also be interpreted as applying to other weapons, in addition to or excluding firearms. Even more particularly, the present invention also extends to embodiments in which the term firearm is replaced with the term weapon irrespective of instances in which the term weapon is interpreted as excluding the specific firearms that are identified above.

The term "firearm data" can include any combination of data related to a firearm, such as a condition of the firearm (e.g. an age, a quality, a usability, a size, a type, a color, or a history), a restriction related to the firearm (e.g. a legal restriction or a munitions capacity or use restriction), as well as firearm transaction data, such as but not limited to historical or standardized pricing information, offer for sale information, offer to purchase information, counter-offer information, or transaction ticket data.

The term "transaction ticket data" is used herein to reference transaction data that is related to a ticket, a receipt, a coupon, a certificate, or other document that is generated in response to an offer to sell a firearm or an offer to purchase a firearm, and that provides identification information specifically related to the firearm and the transaction. The transaction ticket data sometimes includes financial data corresponding to an amount due or an amount paid for the firearm or services related to the firearm. In some instances, the transaction ticket data can also include information identifying any combination of sellers, buyers, or FFLs.

The transaction ticket data can be transmitted, displayed, and/or reproduced in a single consolidated format (such as a physical or electronic ticket), or transmitted, displayed, and reproduced as separate and individual objects.

It will be appreciated that while the transaction parties, namely, the sellers, buyers, and FFLs, can include human operators, each of the sellers, buyers, and FFLs, as defined herein, can also include computing systems utilized by the human operators to complete the online transaction. In every claimed embodiment, a computing system is involved in performing at least some of the recited claim limitations that are critical to the functionality of the claimed invention. In some instances, the seller includes a computing system, in other instances the buyer includes a computing system, and in yet other instances, the FFL includes a computing system. In some embodiments, all or at least a plurality of the seller, buyer, and FFL include corresponding computing systems.

The term "computing system" should be interpreted as at least one computing device (e.g. a server, desktop computer, a laptop computer, a computer kiosk, a cell phone, a PDA (e.g. an IPhone), or any other computing device) that has a specialized hardware processor or hardware processing component configured to execute computer-executable instructions stored on one or more computer storage media. The term "storage media" should be interpreted as one or more storage media that are either integrated into the computing system or that are detachable from the computing system (such as a disk). Storage media can also include any combination of volatile and non-volatile memory comprising optical, magnetic, or other storage media located in one or more different locations local or remote to the computing system. Accordingly, it will be appreciated that the term computing system can also apply to an array of system devices, servers, or other computer networks in which various components are distributed throughout various systems or devices.

In most embodiments, each of the computing systems also include one or more input and output devices as well as suitable communication interfaces for communicating through a network, such as the Internet, with at least one other computing system. The input devices include, but are not limited to keyboards, touch pads, microphones, mouse devices, and any other input devices. The output devices include display screens, speakers, printers, and other output devices.

Various computer network configurations can be used to implement the claimed invention, with FIG. 1 representing a non-limiting example of one suitable configuration. As shown in FIG. 1, a network 100 is provided that includes a server system 110 that is in communication with one or more seller system(s) 120, buyer system(s) 130, FFL system(s) 140, and one or more third parties 180 through one or more communication links 150. The third parties can comprise manufacturers, government agencies, wholesalers, or other third parties, as well as correspondingly associated computing systems. The third parties can also include one or more specialized computing system(s), such as computer kiosks that are communicably connected to the server 110, the buyer system(s) 130, the seller system(s) 120, the FFL system(s) 140, a manufacturer, government agency, wholesaler, or another third party entity.

The server system and the other transaction systems, namely, the one or more seller system(s) 120, buyer system(s) 130, FFL system(s) 140, and third party system(s) 180 each include various computing modules that are operable to implement the various computerized aspects of the invention that are described throughout this paper, as recited in the claims. While only the server system 110 is presently shown to include any computer modules, it will be appreciated that each of the other transaction systems (the seller 120, buyer 130, FFL 140, and third party system(s) 180) also include the necessary modules to interface with the server 110 and with each other, and to perform their correspondingly recited activities described throughout this paper and in the claims. It will also be appreciated that the term server, seller, buyer, FFL, and third party are not mutually exclusive in all embodiments. In particular, it will be noted that in some embodiments, the seller system(s) 120, buyer system(s) 130, third party system(s) 180, and/or server system 110 are also FFL system(s) 140. Similarly, seller systems(s) 120 can also comprise buyer system(s) 130.

The computer modules currently embodied in the illustration of the server system 110 include a sell module 162, a buy module 164, an FFL module 166, a rules and GPS module 168, an interface module 170, and a transaction module 172. Each of these modules comprises computer-executable instructions that are stored within one or more physical computer storage media, such as storage 174, and are executable by a hardware processor, such as server processor 176, to implement aspects of the claimed invention. Each of the illustrated computing modules 162-176 will now be described in more detail.

The sell module 162 comprises computer-executable instructions for implementing the processes associated with the seller. In particular, the sell module 16 includes instructions for, among other things described herein, generating and displaying interfaces at one or more output devices that are associated with the seller system(s) 120, for gathering seller information, such as seller account data or firearm data, and for accessing or providing FFL data and transaction data, as described in more detail below. This can include obtaining and displaying firearm data for firearms to be sold, identifying any FFLs to be involved in the transaction, and obtaining location information corresponding to a residence of the seller or the intended location of the transaction. It can also include displaying, to the seller, information related to pricing standards, existing offers for sale of related firearms, and currently available inventories.

The buy module 164 comprises computer-executable instructions for implementing the processes associated with the buyer. In particular, the buy module 164 includes instructions for, among other things described herein, generating and displaying interfaces at one or more output devices that are associated with the buyer system(s) 130, gathering buyer information such as buyer account data or firearm data, and accessing or providing FFL data and transaction data including offer data as described in more detail below. This can also include such things as obtaining and displaying firearm data for firearms to be purchased, identifying any FFLs to be involved in the transaction, and obtaining background check information and location information corresponding to a residence of the buyer or the intended location of the transaction. It can also include displaying information related to pricing standards, existing offers for sale of related firearms, and currently available inventories.

The buy module 164 also comprises computer-executable instructions for providing information for firearms that the buyer wants to buy but that do not currently exist in currently available inventories, and for searching other third party databases for the firearms. When the firearms are located or become available in inventory, the buy module 164 is able to notify the prospective buyer of the same.

The FFL module 166 comprises computer-executable instructions for implementing the processes associated with the FFL. In particular, the FFL module 166 includes instructions for, among other things described herein, generating and displaying interfaces at one or more output devices that are associated with the FFL system(s) 140, gathering FFL information such as FFL account data or firearm data, and accessing or providing firearm data and transaction data, including inventory data and verification data such as firearm condition data and seller data, as described in more detail below. This can also include obtaining third party content to be linked to or listed on the server interfaces as a virtual store front, for example.

The rules and GPS module 168 comprises computer-executable instructions for identifying locations of buyers and sellers based on account data and residential or mailing addresses, as well as current and dynamically identified GPS locations. Location data is also obtained for FFLs to be involved in a transaction and for other specified locations where firearms transactions are intended to take place.

The rules and GPS module 168 also identifies and stores the local, state and federal regulations related to the various jurisdictions where the buyers and sellers may be located, and updates these regulation records regularly. Updating can be done periodically on a daily basis, a weekly basis, or on any other basis. Updating can also be performed on demand, upon detecting a transaction in processes, or in response to receiving buyer, seller, or FFL data corresponding to a particular transaction or inquiry. When updating is performed on a periodic basis, the regulations corresponding to all firearms currently listed as available for sale are updated, thereby helping to preempt any potential violation of regulations involving the available inventories.

The rules and GPS module 168 also includes adequate filters to automatically filter through existing inventories and the offers to purchase or sale firearms. These filters create or modify lists of the firearms inventories and offerings that are available for buyers and sellers residing in or transacting in specific jurisdictions based on the relevant firearms regulations for those jurisdictions.

As suggested above, filters are also provided by the rules and GPS module 168 to transform a master inventory and sales listings into one or more filtered lists that include only firearms that are available for prospective buyers and that can be sold by sellers based on classifications associated with the prospective buyers and sellers, such as, for example, based on whether the prospective buyer or seller is restricted from having weapons, whether the buyer or seller is a private citizen or a government agency, and so forth, and by cross-referencing jurisdictional regulations corresponding to the parties' locations.

The rules and GPS module 168 also includes computer-executable instructions for identifying attempted illegal transactions involving restricted parties (e.g., based on classification, such as, for example, based on criminal records, or other legal classifications/restrictions) or restricted firearms (e.g., stolen or prohibited firearms), and for notifying appropriate government agencies of the same when required or when determined to be appropriate according to system policies.

The interface module 170 comprises computer-executable instructions for generating, transmitting, and displaying any of the interfaces described herein and for accessing and displaying firearms inventory data as well as firearms regulation data and offer information.

The interface module 170 comprises computer-executable instructions for enabling communications between the server system 110, the seller system(s) 120, the buyer system(s) 130, and the FFL system(s) 140, as well as other third party sources 180, such as government agencies, wholesalers, manufacturers, and other third parties to identify inventories and regulations, as well as for providing links to the websites of the third party sources, such as an FFL's website, a government agency website, a manufacturer's website, a wholesaler's website, or another third party website. In some instances, this enables a virtual storefront for a third party website to be accessed and viewed through the interfaces of the server system 110. This also allows prospective buyers and sellers to view government regulations in more detail when desired. This also allows, among other things, for the FFLs and server system 110 to provide necessary transaction data (such as background checks, identification of stolen merchandise, and certain sales or ownership data) to government agencies, as required for certain transactions.

The interface module 170 also comprises computer-executable instructions for interfacing with the other illustrated modules (162-168 and 172), the processor 176, the system storage 174, as well as communications hardware (not illustrated) within the various systems to enable wired and/or wireless communications utilized by the appropriate communication link(s) 150.

In some embodiments, the interface module 170 also comprises computer-executable instructions for performing translations between different languages and/or between text and voice. For example, in some embodiments, an FFL can call in a confirmation of receipt of a firearm, or a buyer or seller can enter data over the phone. The data can be converted from dial tone entry or verbal input into corresponding text and used to update the records stored by the server.

The interface module 170 also provides tools for facilitating instant messaging, blogs, chat interfaces, and other forms of real-time communication between sellers, buyers, and FFLs, as well as operators and other customer service personnel associated with any of the server system(s) 110, seller system(s) 120, buyer system(s) 130, FFL(s) 140, or third parties 180.

The transaction module 172 comprises computer-executable instructions for identifying, generating, displaying, and/or transmitting transaction data related to specific transactions. In some instances, this includes gathering data about specific sellers, buyers, and/or FFLs, as well as transaction pricing and sales data. This can also include gathering information related to specific firearms, such as type and other condition information. This can also include the generation, displaying, and transmitting of transaction ticket data, as well as other transaction data that is usable to facilitate the transactions and verifications described herein.

In some instances, the transaction module 172 also comprises computer-executable instructions for tracking historical transaction data that is entered into one of the interfaces generated by the server system 110 and/or that is obtained through the use of a webcrawler or other tool that explores historical sales data on one or more third party 180 websites or databases. This data can be used to obtain or calculate the pricing data described herein.

The transaction module 172 also comprises computer-executable instructions for calculating and/or adjusting pricing standards and historical records based on any newly obtained transaction and/or historical data.

The transaction module 172 also comprises computer-executable instructions for managing firearms auctions made available through interfaces provided by the server system 110 which involve inventories held by private sellers 120, FFLs 140, manufacturers, government agencies, or other third parties 180.

The server storage 174, which stores the computer-executable instructions of the various computing modules, is shown as a single storage medium that is local to the server 110. However, it will be appreciated that storage 174 can comprise any combination of local and remote storage media that are distributed among one or more different system devices or different systems. The remote storage can also comprise any combination of system memory as well as detachable physical storage media, such as magnetic or optical diskettes, flash drives, or other storage media.

The storage 174 of the server 110 also stores the various data used to compile master inventory lists of jurisdictional regulations, master lists of firearms inventories, master lists of pricing standards, master lists of current sales and auction data, as well as historical transaction data, master lists of FFLs, sellers and buyers having established accounts and corresponding account information, and master lists of other firearms and transaction data. Storage 174 also stores filtered lists of the foregoing master lists, which have been created through one or more transformation processes of the master lists by the server.

While the various modules and components of server 110 are shown to be separate elements, it will be appreciated that the various modules and components can also be combined into any desired quantity of consolidated and/or discrete elements, from one to many. It will also be appreciated that each of the illustrated seller system(s) 120, buyer system(s) 130, FFL system(s) 140, and third party system(s) 180 can host any combination of the modules and components described above with respect to server 110.

Attention is now directed to FIG. 2, which illustrates a flow chart 200 of various elements associated with facilitating online firearms transactions corresponding to a seller system 120, an FFL system 140, a buyer system 130, and a server system 110.

As shown, the seller system provides account data (act 210) that can be used to generate a seller account and, in some instances, to perform a firearm background check to verify that the seller is actually authorized to possess the firearm(s) being sold. This account data can include name data, address data, and other personally identifiable data, such as social security number data, driver's license information, citizenship data, employment data, and other personal data. Contact data, such as phone numbers and email addresses, can also be obtained to facilitate communications with the seller. Banking data can also be obtained to verify a banking institution, credit card, or account from which money can be withdrawn to pay for any fees associated with performing a background check, verifying a condition and existence of a firearm, listing or advertising the firearm, transporting a firearm, or any other transaction fees.

The act of providing account data (210) can be performed through a server interface, which is displayed on a display device, and which queries for the data that is subsequenly entered into input fields provided by the interface. The input fields and queries can be presented on the interface, for example, in response to a user selection of an appropriate link on a server webpage. One example of such a link is the My Account link (310) represented in the interfaces shown in FIGS. 3-4. Alternatively, the account data (210) can be submitted over the phone via email or regular postal mail to any party that enters the data into an appropriate electronic form that is accessible by the server 110.

Buyers 130 and FFLs 140 are also able to provide similar account data (acts 212 and 214, respectively) corresponding to the respective buyers 130 and FFLs 140 through similar interfaces presented to the buyers 130 and FFLs 140 as were presented to the seller 120. While many of the types of account information obtained from the buyers 130 and FFLs 140 is of a similar type as the information obtained from the seller 120, it will be appreciated that some types of account information will vary. By way of example, the FFLs can also be queried for, and provide, FFL registration/license information. The FFL can also be queried for, and provide, website information for their own third party webpages to be linked through one or more menu options on the server interfaces.

Once the server obtains the account data (act 216), the server performs the necessary background checks and verifications and then creates the corresponding accounts (act 226), if the accounts are authorized according to firearms regulations based on jurisdictional requirements, entity classifications, and the system's own rules and membership and financial policies.

The seller 120, the FFL 140, and buyer 130 will provide firearm data corresponding to any firearm to be sold, bought, held within inventory, or inquired about either for general inquiry or to make an informed decision about buying or selling the firearm. (Acts 220, 222 and 224, respectively). In some instances, this data includes specific offer data provided by a buyer (act 225) in response to an existing offer for sale or provided in an offer to buy a firearm that is not already listed for sale, and in some instances that is not even available in inventory. Once the firearm is made available, the buyer can be notified.

The server 110 obtains this firearm data (act 228) and updates the lists of firearms data that are maintained by the server. These lists include inventory lists of available firearms, member lists of FFLs, buyers, and sellers, transaction lists corresponding to specific items for sale, and historic pricing and sales lists corresponding to historical data related to prices and transactions corresponding to firearms of a same or similar type.

Pricing lists are also maintained by the server 110 to reflect pricing standards that are calculated by the server 110 or another third party clearinghouse that establishes the fair market price for firearms. The fair market price for the firearms is calculated or updated (act 230) with firearm data that is gathered (act 228) about the firearms from the sellers, FFLs, buyers, third parties, and historical data. This firearms data includes firearm condition information and sales price information gathered over time and analyzed to determine an appropriate fair market price.

The fair market price is also adjusted by the server, according to some embodiments, in view of weighting factors such as available inventories and existing regulations regarding the firearms. The values of the weighting factors can be set and are customizable by an authorized administrator or, alternatively a plurality of authorized administrators that are established to prevent potential pricing abuses by a single administrator. In other embodiments, the weighting factors are automatically adjusted in view of dynamic changes to inventory or historical sales data.

Market price can also be set as a manufacturer suggested sales price with or without adjustment based on the weighting factors. The suggested sales price data can be obtained from a manufacturer database in response to a specific request by the server system or, alternatively, as an unrequested data item. A manufacturer may want to provide this information without solicitation, for example, to promote or control sales and distribution lines of their manufactured products.

Market prices can also average any combination of manufacturer suggested sales prices, current sale prices, and/or historic prices with or without adjusting the average based on the weighting factors.

Figure 3:
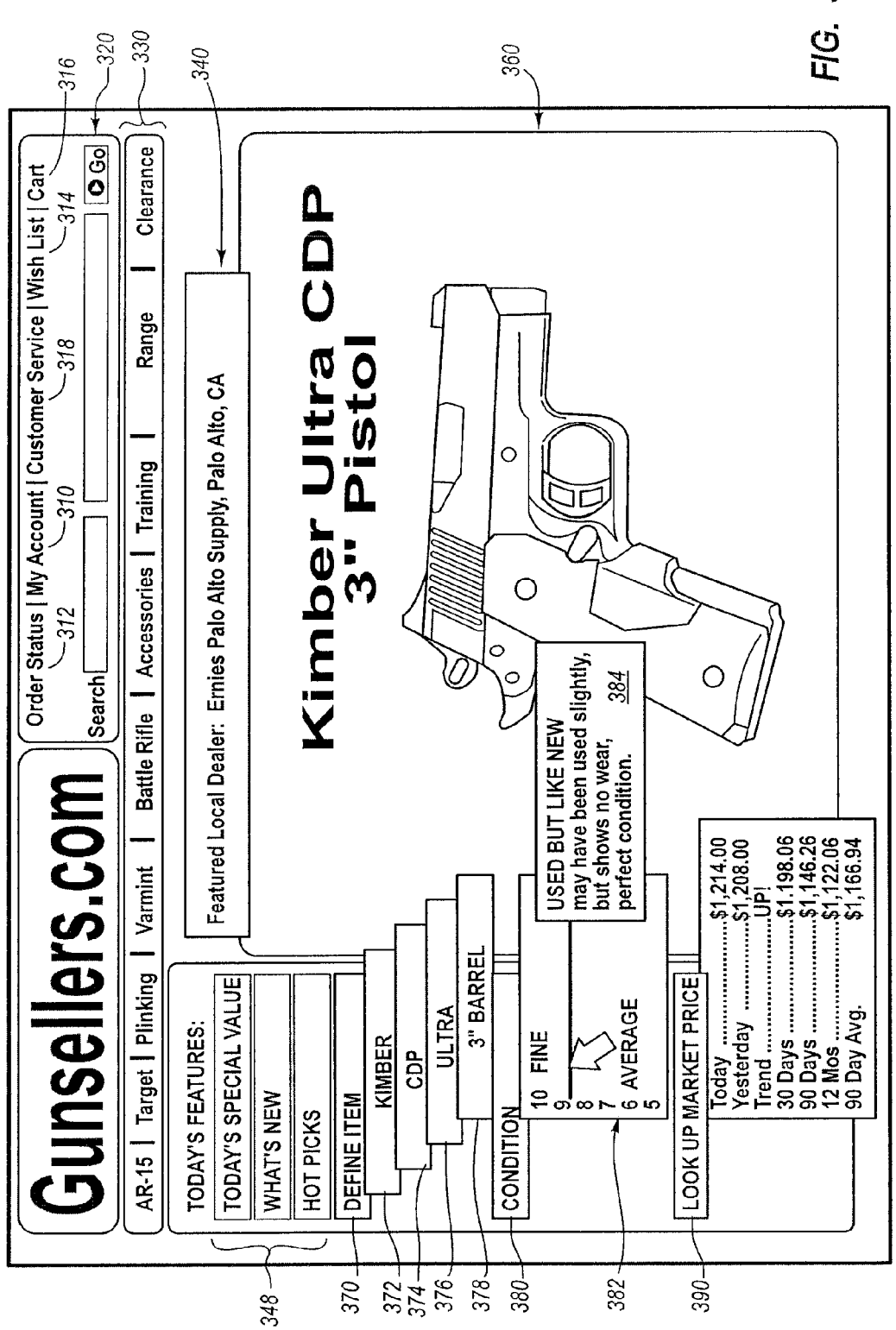
FIG. 3 illustrates one embodiment of an interface for facilitating online firearms transactions.
Figure 4:
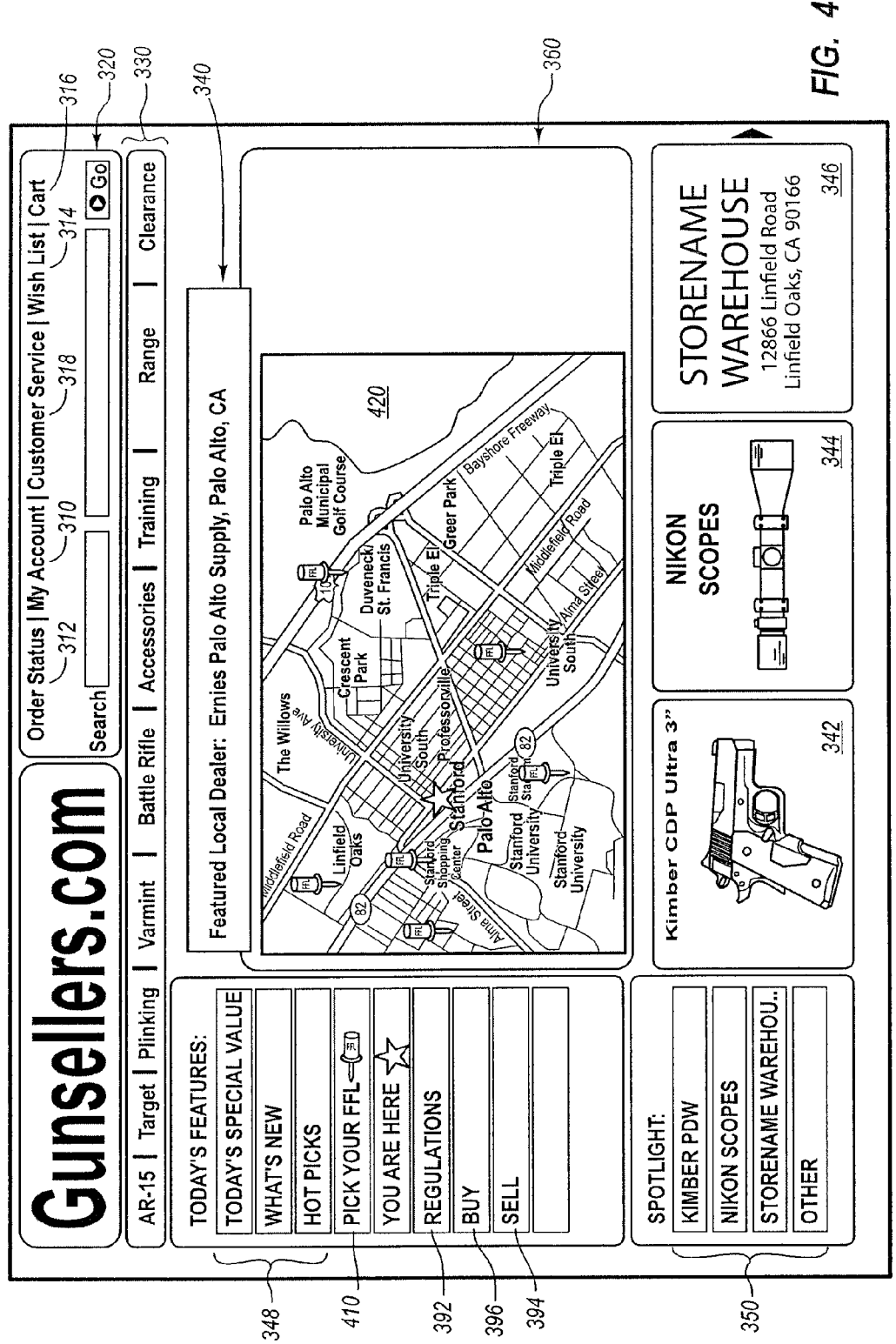
FIG. 4 illustrates another interface embodiment for facilitating online firearms transactions.

The pricing standards and other firearms data is provided to the various sellers 120, FFLs 140, buyers 130, and other third parties through interfaces, such as shown in FIGS. 3-5, as well as other interfaces. According to one embodiment, the data is presented (act 232) in an unfiltered state so as to include all available information related to a specific query or topic related to a firearm or firearm transaction. For example, all information corresponding to available inventory for a particular type of firearm can be presented including all historical data corresponding to sales of that firearm and all fair market pricing information related to the firearm.

In an alternative embodiment, the information is filtered (act 232) so as to provide only a limited set of the available information. Available information is filtered according to some embodiments, for example, to display only the information that is relevant for a particular party. In some instances, this includes filtering out all transaction information that corresponds to firearms that are not permitted to be bought or sold by a particular entity due to legal restrictions placed on the firearms and/or parties involved. The legal restrictions can also be based on either the classifications of the entities and firearms and/or the jurisdictional requirements applicable in a particular geography based either on the residence of the parties involved, the current GPS locations of the parties, and/or any other specified locations for conducting the transaction (including, but not limited to the locations of FFLs that are intended to be involved in the transaction).

In response to accessing the firearms data (acts 220, 222, 224), the seller 120, buyer 130, and FFL 140 will engage in a transaction involving the corresponding sale, purchase, verifying, processing, modifying, storage, and/or transportation of a firearm.

In one embodiment, the seller 120 will receive a transaction ticket or other transaction data (act 240) for any firearm for which the seller has initiated a sale through the server interface(s). In some instances, this transaction ticket is a receipt that is generated when an appropriate transaction fee has been paid and includes relevant transaction data. This transaction ticket information can be provided (act 242) to any appropriate FFL to identify the transaction and firearm. In most instances, the appropriate FFL will be an FFL that is geographically proximate the seller location and that has been identified by the seller in response to the seller accessing FFL data provided by the server. (Act 244).

An FFL can also obtain transaction ticket data (act 246) and other transaction data from a buyer who might provide the data to the FFL (act 248), for example, to obtain a purchased firearm and to obtain a background check. The transaction data can be electronically provided to the buyer, seller, and/or FFL through one or more interfaces presented by the sever (act 250) or mailed or delivered by any of the parties.

The FFL can use different types of transaction ticket data or other transaction data received from the seller, the buyer, the server, or a third party to identify a particular transaction and verify the information (act 252) related to that transaction, including the existence of the firearm, the firearm's condition(s), a seller's deed of ownership (if one exists), a buyer's background check (if required), and all other related transaction information. The FFL will, in most instances, receive financial compensation for performing different verification tasks (252), as well as for holding, cleaning, repairing, upgrading, and shipping or otherwise processing the firearm, as appropriate and as agreed upon by the buyer, seller, and/or FFL during various stages of the transaction. Each of these tasks can be specified and agreed upon, for example, through the server interfaces prior to initiating the generation of the transaction ticket data.

It will be appreciated, however, that an FFL is not legally required to participate in all transactions. If it is determined that an FFL is not required to participate in a particular transaction, the seller can alternatively provide the transaction information and/or firearm directly to the buyer with or without a specific transaction ticket as appropriate and according to agreements and policies established between the server, seller, and/or buyer through the server interfaces. It is anticipated that very few of these types of transactions will occur, since such transactions are generally limited to intra-state transactions, and will, in most instances, require the consent of the buyer through the online interfaces. For example, most buyers are likely to require that the firearm be inspected to verify the condition and existence of the firearm as well as the legality of the transaction.

According to some embodiments, the FFL will be the same FFL selected by both the seller and the buyer such that the buyer and seller can interact with the same FFL. In other embodiments, the FFL selected by the seller is different than an FFL selected by the buyer. For instance, a seller and buyer might each access FFL data (acts 244 and 248) and select (either automatically or manually) different FFLs that are the closest in proximity to the seller and buyer, respectively, or that satisfy other FFL criteria (e.g., FFLs that are able to provide special services for inspecting, testing, modifying, or storing the firearm). In these instances, the seller's FFL and the buyer's FFL can coordinate to transfer necessary documents and firearms products between themselves with or without use of the server interfaces.

Ultimately, the firearm and any appropriate transaction ticket data or other transaction data is provided to (act 260) and received by the buyer (acts 262 and 264).

As clarified above, various mechanisms are put in place to help verify that the transaction is legally permissible. These verification mechanisms are often based on the classification of the firearm, the classifications of the parties involved, and/or the jurisdictional requirements associated with the location in which the parties reside or in which the transaction occurs. In some instances, for example, the FFL involved in the transaction provides verification (act 252) of necessary elements in the transaction, including but not limited to seller data, buyer data, and firearm data.

The server can also provide additional or replacement verification support (act 270) corresponding to the seller data, buyer data, and firearm data so as to help prevent transactions from occurring when either the firearm or an entity involved in the transaction are prohibited from participating in the transaction based on their classification(s), jurisdictional requirements, financial limitations, waiting periods or any other reason.

Attention will now be directed to FIGS. 3-5, which illustrate various interface embodiments that can be used to facilitate some of the online firearms transactions described above. Interface 300 is illustrated as having different configurations within FIGS. 3 and 4. This interface 300 includes various selectable display objects that, when selected, present the user with options for providing or receiving data corresponding to a firearms transaction and for entering or receiving the firearm, regulation, and transaction data described above. Various different configurations of the interface 300 can also be provided to alter the manner in which information is gathered or displayed to satisfy different needs and preferences.

According to the present embodiments illustrated in FIGS. 3 and 4, a My Account object 310 is provided. This object 310, when selected, provides access to additional interfaces through which a user is enabled to access and modify account information and, in some instances, to create or delete an account.

An order status option 312, when selected, provides a user with information corresponding to a transaction in process for which an order or offer has been placed.

The wish list option 314, when selected, provides a user with interface options for identifying or viewing firearms data corresponding to the firearm(s) that are not presently available in current inventory, but for which the user will be notified when they become available.

The cart option 316, when selected, provides a user with interfaces that identify items that have been purchased and in some instances received. This is particularly useful for embodiments in which the user updates the reported information to reflect the receipt of a purchased item and to verify a conclusion of the firearms transaction.

Search options 320 are also provided for searching for particular transactions and/or firearms available within current inventories, as well as for firearms that are not currently available. The search options 320 can also be used to search for FFLs, manufacturers, buyers, sellers, and other parties, as well as for firearms regulations.

Various other selectable menu options 330 are also provided for accessing additional information that is related to particular types of firearms or firearms related training opportunities, shooting ranges, accessories, clearance items, and other firearms related data. Each of these options 330, when selected, provides corresponding information to the user within the interface 312 or within another interface.

In some embodiments, advertising frames or objects are also provided, such as banner ad 340, frames 342, 344, and 346, and display options 348 and 350, which comprise selectable menu options that, when selected, display corresponding advertisement data. In some instances, this includes linking to and displaying third party webpages. This can be done by displaying the information in new display windows or by displaying the linked information directly into the existing interface 300 within any frame of the interface, including frame 360 or frames 342, 344, and 346 such that the interface 300 operates as a virtual store front for the FFL, manufacturer, or other party advertising the content.

Some of the displayed menu options also provide the user with quick links to regulations that are either searchable and/or that are filtered by geographic jurisdiction. The filtering can occur automatically based on the member account information (e.g., address), or manually in response to a user selecting a geographic location.

Certain interface objects are presented, in some embodiments, for enabling a user to provide data related to a firearm to be sold, purchased, or inquired about. The define item object 370 comprises one of these objects. Through the define item object 370, a user is able to identify a firearm type. The firearm can be identified by entering data into a data field or by selecting the firearm from a displayed menu after selecting the define item object 370. In some embodiments, the user is presented a series of internested pull down menus to identify a firearm type by various different classifications and descriptions. As shown in the present embodiment of FIG. 3, a user has selected descriptions of a firearm comprising Kimber (372), CRIMSON TRACE (374), COMPACT (376), and 4" (378) descriptions. Each description has been individually selected through a separate pull down menu. In preferred embodiments, each submenu or nested menu presented to a user for selection of a firearm type will be filtered after the first description is entered or selected to provide only the relevant firearm descriptions that are sub-classifications corresponding to the previously identified classification.

The illustrated interface also includes a condition display object 380 which, when selected, provides a set of predefined condition rankings 382 that are presented to the user for selection. Through this option, the user is able to specify the condition of the firearm that is to be sold, purchased, or inquired about. Preferably, each of the predefined condition rankings corresponds to a standardized description which will be presented to the user on the interface. In some embodiments, the descriptions are presented dynamically, in response to a user selecting or hovering a mouse prompt over one of the rankings 382. For example, in the present embodiment, a mouse prompt is hovering over the level 9 ranking and the corresponding description 384 is presented for the user to identify what the description of a level 9 ranking is.

In many embodiments, an FFL will also preferably rate the firearm when the FFL has possession of the firearm during the verification processes described herein. The FFL will rate the firearm based on a standardized point and click protocol involving multiple choice type questions. A corresponding rating (stated as a percentage or another indicator) is identified by the system next to the firearm data presented in the server interfaces. In addition to ratings such as "90%," there are also options for "NIB" (New in Box), "never fired", unrated, and so forth.

Another interface object that can be presented to a user includes the market price object 390. When this object is selected, the user is presented with market pricing data 392 that can include a current fair market price, one or more market prices corresponding to a different time period (e.g. yesterday, last week, etc.), pricing trends, and/or average market prices for different time periods.

Once a firearm is adequately identified with the firearm data provided through the interfaces, a user can place the firearm for sale, make an offer for purchasing the firearm (if it is available), place the firearm on a wish list (if it is not available), or find out more information about the firearm (e.g., inventory levels, restrictions, and so forth). Corresponding interface objects are presented to facilitate these activities including the regulations object 392, the sell object 394, the buy object 396, and the wish list object 314. In some instances, an image of the firearm is reflected in a window of the interface such as window 360. FIG. 5 shows another representation of a firearm description provided in a screenshot 500 corresponding to an auction or other type of transaction that can be presented to buyers and sellers through the interface of the invention. According to one embodiment, the screenshot 500 is presented to a user in response to the user selecting a specific auction offering that is displayed through an auction interface page.

Similar screen shots can also be displayed whenever a firearm is adequately identified for sale, purchase, or inquiry. Such an interface or description can be accessed by identifying the firearm directly, as described above, or by selecting the firearm from a visual and/or textual menu that identifies a plurality of different firearms or transactions that are currently available through the server interfaces.

Screenshots that are similar to the one shown in FIG. 5 can also be modified by the system to include less information or additional information corresponding to a specific transaction, as necessary, to indicate a transaction sale date, the name or identifier of the seller or purchaser, and other transaction data that can be used by an FFL to identify the transaction and to confirm the identity of the buyer, seller, and firearm. In some embodiments, a modified screenshot can comprise a ticket like receipt that can be presented by a seller or buyer to the FFL when the firearm is delivered or received from the FFL. The receipt can either be in an electronic or paper format, and can include information regarding fees already paid and identification of the seller or buyer.

In some embodiments, the FFL can also modify the transaction ticket data or other data reflected in a screenshot of a firearm description page through one of the server interfaces after the firearm has been delivered to the FFL. For instance, the FFL can modify the information displayed to indicate that the firearm has been received and to verify attributes of the firearm. The FFL can also indicate the firearm has been upgraded, tested, cleaned, or shipped. This information is updated and displayed on the interface for corresponding buyers and sellers involved in the transaction to know the status of the firearm transaction. Notifications can also be generated and sent by email or other means to the various parties involved to provide updates regarding progress being made in completing the transaction.

Once the seller receives the firearm, the FFL and/or seller can also modify the transaction data to indicate that the firearm transaction is complete.

According to some embodiments, the buyers, sellers, and FFLs are also able to transfer funds out of and into their banking accounts for necessary fees, costs, and purchase prices associated with the firearms transactions. In some embodiments, the FFL will receive a percentage or flat fee for its involvement in a particular transaction. These fees can be displayed and agreed upon through the various interface options presented during the transaction. Preferably, escrow, direct wire transfer, credit card, and/or PayPal type options are available through the various server interfaces that are presented during the transaction.

Additional interface objects, displays, and options presented to a user through the server interfaces link to blog, I/M, and chat interfaces, as well as other interfaces for obtaining any of the transaction data described throughout this paper.

One of the additional interface options that are presented to users includes the pick your FFL object 410, shown in FIG. 4. This option, when selected, allows users to identify the specific FFL that they wish to transact with and through which a firearm will either be delivered or received. In one embodiment, users are presented a map 420 corresponding to a selected or identified geographic region defined by data the user has manually entered or selected. Alternatively, the map 420 is presented automatically in response to the user selecting the FFL object 410 or another object, and based on the user's current location, as dynamically determined by GPS technology, or based on the user's account data (e.g., the user's residence or mailing address).

Preferably, the user can zoom in or out on the map 420 to identify one or more FFLs on the map. The user's relative position on the map (as determined by GPS or account data) can also be shown on the map. According to some embodiments, the server utilizes maps and map functionality provided by Google maps or other map services to identify at least location and address information.

The user can select any of the identified FFLs to obtain additional information about the FFLs, such as contact information, fee information, policy information, or other information about the FFLs. Selection of an FFL can also designate the FFL as the FFL that will be involved in the transaction. Once an FFL is selected for participation in a transaction, the FFL is sent communication from the server notifying the FFL of the transaction. This notification can be sent electronically or by paper mail delivery.

In some embodiments, another map can be presented through interface 300 or another interface, which identifies different selectable regions of a state or the country corresponding to different firearm regulations. Any selected region(s) are then used to filter the available inventories of firearms that are presented to the user through the interface, based on the regulations corresponding to the selected region(s). The filtered lists can also be based on the selected region(s) in combination with the user's account address or current GPS location, inasmuch as the locations at both ends of a transaction are relevant for determining whether a transaction is permissible. A user can also specify whether the user is willing to travel to the selected region (if he does not already reside there) to avoid certain interstate or inter-regional firearms regulations. Answers to this query can also be used to modify filtered lists, as appropriate, and to list all available inventories and transactions legally available to the user based on the known circumstances and criteria.

It will be appreciated that the foregoing interfaces, as well as all other interfaces referred to herein, can be presented to users at the computing devices of the buyer, the seller, the FFL, a third party, or specialized kiosks.

Using interfaces and systems described above, an individual can either sell the firearm directly through the interface or use an FFL to sell their firearm(s). A user can have an FFL sell his firearm, for example, by dropping the firearm off at a selected FFL after completing one or more forms on the server interface(s) that adequately identify the firearm. In some instances, this is all done on site, at the FFL through a Kiosk or other computing system, for example.

The seller also pays a small non-refundable processing fee by credit card or other financial means described above which goes to the server system and/or FFL. The amount of the fee can vary depending on the type of services being requested by the seller (e.g., verification processes, special handling, or upgrading services, and so forth). The server system then generates a receipt or transaction ticket for the fee paid which includes a description of the weapon as well as a list of local authorized FFLs the user can bring the weapon to. Alternatively, the seller can select an appropriate FFL from an interface map, as described above. The seller then brings or ships the receipt and firearm to the selected FFL who signs the receipt/ticket and inspects the firearm and confirms and grades it as part of the verification process. The FFL then updates the transaction data based on the verification processes on either one of the server interfaces or through a phone call placed to an operator or automated server interface configured to receive and update the transaction data at the server.

The FFL then lists the firearm as available for sale on the server website interface(s). The FFL can pay the seller directly for the firearm and sell the firearm for additional profit based on a subsequent sales price, or the FFL can list the firearm for sale on behalf of the user and provide the user with all or a portion of the profits obtained from the subsequent sales price after appropriate fees have been collected.

A buyer can also purchase a weapon in a similarly convenient manner by identifying and paying the appropriate fees for a firearm identified on the server interfaces. The buyer then presents the appropriate receipt/ticket information to the FFL holding the firearm. The buyer also fills out necessary government forms, such as ATF form 4473. This can be done on a buyer system or at an FFL kiosk or other system. By filling in this form, the buyer either self-qualifies or self-disqualifies for a particular transaction. Firearms and transactions for a buyer can also be filtered to list only firearms and transactions the buyer is qualified for based on the results of completing this form and/or other forms. Data generated from completing the form(s) can be included with the transaction data sent to the FFLs or sellers for purposes of completing the transaction. A corresponding NICS (National Instant Criminal Background Check System) and other verifications performed by the FFL or other parties involved in the transaction can also accompany the transaction data stored by the server and/or transmitted to any necessary parties, including government agencies.

The FFL then provides the firearm to the buyer once the appropriate background checks and other requirements are completed and verified. In some instances, the buyer is also able to identify an FFL where he wants to have the firearm serviced, processed or delivered for pick up or for additional shipping to the user. For instance the buyer may want a particular FFL capable of upgrading the firearm to receive the firearm prior to shipping it to the buyer. Similarly, firearm regulations may require the buyer to identify a second FFL to receive the firearm after it is shipped from the first FFL (such as when the firearm is being transported across state lines or for other legal requirements). If the selected FFL is different than the initial FFL holding the firearm, the server system transmits appropriate transaction data to the different FFL and coordinates the shipping of the firearm from the first FFL to the second FFL for final processing and delivery. Any number of FFLs can also be involved in the transaction.

One benefit that can be achieved by the present invention is that prospective buyers and sellers are able to view their various options for selling and/or buying firearms based on their legal qualifications, the legal regulations of their corresponding jurisdictions, and the classifications of the firearms. Accordingly, the server will limit certain sales and the ability of certain sellers and buyers to engage in certain transactions based on their residence and/or current GPS locations and based on current firearm laws for corresponding jurisdictions and firearm classification(s). This limit can be imposed in part, by filtering lists of available firearms and transactions displayed to users so that they are only able to see legally permissible transactions and firearms that they can buy. The interface can also prevent sellers from advertising unauthorized sales or transactions.

According to some embodiments, a seller can identify a firearm by category. A category and detailed sub-category will then be matched with state and local laws corresponding to the seller to filter a displayed list of the firearms within the selected category to only those firearms that can be legally shipped. Similarly, a buyer can be restricted from bidding on or viewing firearms that are not allowed to be shipped to the buyer's jurisdiction based on the buyer's residence or current GPS location, thereby helping to preempt any illegal sales based on potential shipping destination.

The interface(s) will also preferably notify users regarding any legal restrictions related to their individual status or ability to sell/buy firearms as well as the status of any particular firearm (e.g. limitations regarding jurisdictions where firearms are not permitted to be sold, classifications of firearms as stolen, restrictions on selling too many firearms in a certain period of time, waiting period requirements, and so forth). Notifications regarding attempted and/or confirmed violations of the foregoing restrictions or any other restrictions can also be generated and sent to appropriate parties (e.g. government agencies).

Additional Embodiments and Clarifications

According to some embodiments, a primary check ensures that buyers are legally allowed to buy a firearm based on the buyer's location. The system not only matches zip code to a legal database for buying restrictions, but also recommends products that may be necessary for compliance. For instance, if a consumer is required to buy a lock or a safe for a gun in California, then the system will suggest that the consumer also buy a lock or a safe prior to concluding the transaction. The consumer would then have to either accept the added/suggested item, or at least have to acknowledge that he is declining the recommendation. For example, the consumer can decline by indicating that he already has a safe. This indication can be made through any of the interfaces. Similarly, there may be laws/procedural rules for each locale such as wait times or required IDs which the system may also impose on the user (i.e. enter your Chicago FOID card number) prior to completing a transaction.

Preferably, the FFL and/or the system will confirm that any additional requirements have been complied with prior to the FFL shipping a purchased firearm to the consumer.

According to many embodiments, the seller, after selecting his weapon to be sold and the condition of the firearm will drop off or ship the weapon (if within state boundaries) to the seller's FFL. The seller's FFL, upon receiving the firearm, confirms its description and grade, and then secures it in its vault, safe, or other form of secure storage (act 254). It is then held there, by the seller's FFL, until it is sold, at which time the seller's FFL ships it to the buyer's FFL.

It will also be noted that any number of FFLs can be involved. However, each transaction will preferably include at least two FFLs, a seller FFL and a buyer FFL. The purpose of the seller's FFL is to verify, receive, and hold the weapon, and then ship it to the buyer's FFL once it is purchased. The purpose of the buyer's FFL is to receive the weapon once it is paid for by a buyer (funds reserved), verify the identity of the buyer, perform the NICS check, allow the buyer to verify that the weapon received on his behalf is the weapon that he paid for, administer the legally required paperwork (4473, etc.), conclude the transaction, and report its conclusion back to the system so that the weapon may be removed from inventory and the funds dispersed.

Preferably, each firearm will be identified by a serial number. Generally, a seller inputs the serial number of a firearm when registering the firearm for sale. This will enable each firearm to be removed from the system inventory once a transaction is completed. In particular, the system identifies and tracks each firearm on an item by item basis. Accordingly, firearms that are bought and sold are tracked all the way through the system and through transactions based on their serial numbers along with other important data. This also enables instant firearm tracing, if ordered by an appropriate regulatory agency, of any "crime gun". Serial numbers of all firearms put into the system can also be recorded and compared to available stolen firearm database NICS systems as part of the initial registration of the firearm when it is first offered for sale. In this manner, the present invention guarantees that all guns sold through the system are not stolen.

When the seller's FFL receives the firearm, the FFL will be required to read and verify the serial number of the weapon and compare it to the seller's "ticket" and confirm, as part of the selling FFL's duty, that the serial number matches. The seller's FFL may also submit the serial number to available stolen firearm database NICS systems to verify that it is not stolen prior to sending the firearm to the buyer's FFL. However, if the firearm is reported as stolen, the local police agency or other government entity may be notified. If the firearm is verified as not stolen, the seller's FFL sends it to the buyer's FFL. Then when the buyer's FFL receives the weapon, the same verification may take place. This assures that no weapon goes through the system without being checked by each FFL it touches. In other embodiments, only the seller's or buyer's FFL will submit the serial number to the NICS system for verification. However, in any embodiment, the system guarantees that a firearm will not exchange hands without first verifying that it is not stolen.

There are regulatory requirements which are imposed on certain FFLs which may or may not be imposed on the system. According to some embodiments, the system will identify and support individual requirements by different FFLs.

The system can also identify and prevent buyers from trying to circumvent the law in other ways. For example, there is a form called a "multiple handgun purchase form" that must be filed by an FFL if a person buys more than one handgun in a five-day period. One way that a person could try to fool the traditional FFL system is to make multiple handgun purchases separately then select a different FFL for delivery in several different places in the person's neighborhood. Normally, the regulators would have no way to be aware of this behavior since traditionally each individual dealer collects the data. However, to the extent that a buyer buys multiple handguns through the system, the system can readily discern the pattern of behavior, create an electronic "multiple handgun purchase form," and send it to the ATF and the other appropriate authorities. There are many situations where this level of transactional scrutiny can be applied and thus reported only where appropriate.

As mentioned above, the system interfaces can provide direct links to the webpages and inventories of participating FFLs. These inventories can be added to the system auction interfaces and/or listed separately on the FFL interfaces.

In some embodiments, form 4473 and other relevant forms are automatically completed by the system based on data known about the buyer, seller, and/or FFLs involved in the transaction and based on member data provided by the parties or data identified by the system independently of any data explicitly provided by the parties. For example, the system can examine and utilize appropriate system cookies and database information made available to the system without requiring the user to provide the information explicitly.

According to some embodiments, the buyer's account information, which was provided by the buyer when the buyer's account was established, is used to at least partially fill in form 4473. Before the buyer finishes the transaction online, the buyer is then prompted to complete the rest of the form online. Based on the buyer's answers to the form, the system can either tell him that the buyer is qualified, or it can determine that the buyer is disqualified. If qualified, the process of reserving funds and selecting the buyer's FFL may continue. Form 4473 is then transmitted to the buyer's FFL either for purposes of the FFL using the transmitted form, or for the dealer's own use, in which case the FFL can still require the buyer to fill out a new form. The buyer will also sign the form and present proof of ID when the buyer picks up the firearm from the FFL.

If the buyer is disqualified (or a "restricted person") based on the data provided in form 4473 or another form, the system will refuse the buyer's attempted purchase and will log the buyer out of the system interface(s).

Benefits of the foregoing should be apparent. In particular, filling in the form in advance reduces potential wasted time and costs associated with FFLs processing data for unqualified buyers. It also means that if someone has filled in the form and represented that he is qualified, but is later determined to not be qualified (i.e. the NICS check comes back negative) then the system will have reasonable grounds to charge the costs of the failed sale (commissions to dealers, buyer, processing cost, credit card cost) against the buyer, since the buyer's misrepresentation created costs for all parties even though the transaction could have never been created.

While NICS system checks may be applied on some sales, they are not necessarily applied on each transaction. The determination as to whether a NICS or other check should be applied will depend on local, buyer and seller type, etc. According to some embodiments, every firearm will preferably undergo NICS checks before the transaction of the firearm is completed.

It is noted that the price database described above checks and monitors pricing data for the firearms. This can include obtaining pricing data for any firearm weapon or accessory advertised by the system. The modules of the system can also identify top selling products and optimal price points for different products based on the pricing data that is identified for each of the products over time. This determination can also be granularly broken down by geographic region.

According to some embodiments, all parties are required to enter contractual obligations prior to being granted membership into the system which define their performance and procedural obligations. Such obligations can be presented and agreed to during the creation of the member accounts.

In one embodiment, law enforcement agencies and others are not required to fill out a form 4473. For example, a police department will alternatively have to submit a letter on its letterhead which will substitute for the form 4473 and background check requirements. The letter will preferably remain in the system for a certain retention period. The system will also allow certain government agencies to buy and sell en masse (multiple items, different items) all in one order which is not possible for some private buyers and sellers.

The foregoing systems and interfaces can also be used to facilitate sales of components and other items between manufacturers and dealers. The system can check and apply the different requirements for these types of sales to ensure compliance with applicable regulations and procedures.

According to some embodiments, an image database is maintained for each standard firearm of each manufacture listed in the system so that when a person selects the firearm that is going to be sold or purchased the system will automatically attach an image from the system file to the firearm description. This will help avoid the common unsightly pictures found on existing websites (e.g. a low quality picture of some rifle lying on someone's couch). Using the image database, a clean white or graph style background will be used behind a clean image of the firearm. This will help the seller verify that he has identified the right weapon, will show the buyer and FFLs what weapon has been defined by the seller to the system, and possibly also will help the buyer understand sizing and shape more particularly than a photo from the seller. Such images can also be obtained from manufacturer image databases or other databases. Links to any of these databases can also be used so as to avoid having to store all image files in the image database.

Preferably, several automated back office FFL systems will aid in FFL inventory and back office management utilized by the system. The system will also preferably interface or integrate with existing and future FFL automated systems.

According to some embodiments, products that are related to a searched for item will be advertised in one of the corresponding interface(s) presented to the user. This will add convenience to the user shopping experience inasmuch as the user will likely be interested in related products.

As suggested above, some embodiments will include notifying law enforcement of suspicious activity, such as multiple sales of handguns to a particular entity or FFL location. Other tracking behavior can also be reported to identify certain "migratory patterns," such as multiple buyers selecting a certain FFL in a certain neighborhood which is suspected of allowing straw purchases (purchases by proxies). In some embodiments, the system includes a database of suspicious activities that automatically detect actual or inferred problems to report to the appropriate enforcement agencies.

As can be appreciated from the foregoing, there are many benefits that can be realized from practicing embodiments of the present invention. Among other things, consumers are provided tools to help them avoid running afoul of government regulations that restrict certain types of transactions without having to learn every one of the numerous regulations involved in all potential jurisdictions. Gun dealers are also provided tools that can be used to remove restrictions on advertizing and selling only available inventory that is physically on-hand. Buyers are provided tools to more easily view available inventories beyond what can be found in local stores, pawn shops, or uncertain places on the Internet, as well as to initiate a transaction for firearms that are not currently in inventory. Buyers are also provided tools to protect them from paying exorbitant prices for falsely advertised products, such as "one of a kind" or "last available" products. Local shortages of ammo and other scarce weapons can also be alleviated through access to national inventories and information.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method implemented by a server computing system for facilitating an online transaction of a firearm, wherein the server computing system includes a processor and memory storing instructions which, when executed, implement the method, and wherein the online transaction involves a seller selling the firearm to a buyer with the use of at least one computerized interface generated by the server, the method comprising:

the server providing one or more interfaces to the seller through which the seller provides seller account data including a location of the seller;

the server receiving the seller account data through the one or more interfaces and generating a seller account;

receiving seller firearm data corresponding to a firearm to be sold by the seller through the one or more interfaces, wherein the firearm data includes at least a description of a type of the firearm, as well as at least a condition of the firearm;

prior to adding the firearm to a database of firearms being sold via the server, receiving verification from a federally licensed firearm dealer that the firearm is in the possession of the federally licensed firearm dealer as well as a verification of the firearm data, including at least the condition of the firearm;

receiving a request from a buyer to view firearms being sold via the server; and displaying the firearms in the database to the buyer.

2. The method recited in claim 1, wherein the method further includes:

determining whether the firearm is stolen prior to adding the firearm to the database of firearms being sold via the server.

3. The method recited in claim 2, wherein the method further includes:

identifying and displaying one or more federally licensed firearm dealers that are determined to be geographically proximate the seller based at least in part on the seller location determined by either account data or a current GPS location;

receiving a seller selection of a federally licensed firearm dealer from the one or more identified federally licensed firearm dealers through the one or more interfaces; and providing the selected federally licensed firearm dealer with information related to the firearm.

4. The method recited in claim 2, wherein determining whether the firearm is stolen prior to adding the firearm to the database of firearms being sold via the server comprises receiving an indication from the federally licensed firearm dealer, to whom the seller has delivered the firearm, that the firearm is not stolen.

5. The method recited in claim 1, wherein the condition is selected from one of a plurality of predefined conditions specified by the server to the seller.

6. The method recited in claim 1, further comprising:

identifying and displaying one or more federally licensed firearm dealers that are determined to be geographically proximate the seller based at least in part on a the location of the seller.

7. The method recited in claim 1, wherein the method further includes generating and displaying pricing data with the firearm for sale and wherein the pricing data includes a current market price as well as historical market pricing data associated with the firearm, the historical market pricing comprising an average market price at which firearms of the same type have been sold over time.

8. A method implemented by a server computing system for facilitating an online transaction of a firearm, wherein the server computing system includes a processor and memory storing instructions which, when executed, implement the method, and wherein the online transaction involves a seller selling the firearm to a buyer with the use of at least one computerized interface generated by the server, the method comprising:

the server providing one or more interfaces to the buyer through which the buyer provides buyer account data;

the server receiving the buyer account data through the one or more interfaces and generating a buyer account;

receiving a request to view firearms that are available for purchase;

identifying a master list of firearms available for purchase; and displaying at least some of the available firearms to the buyer including displaying firearm data with at least one of the displayed available firearms along with condition data wherein at least some of the firearm data including the condition of the firearm is initially specified through the one or more interfaces by a seller of the firearm and subsequently verified, prior to the firearm being listed on the master list, by a federally licensed firearm dealer to whom the firearm is delivered, wherein verifying the condition of the firearm includes verifying that the firearm is not stolen.

9. The method of claim 8, wherein displaying at least some of the available firearms comprises:

filtering one or more firearms from the master list based at least in part on firearm regulations associated with one or more legal jurisdictions associated with a location of the buyer, as determined by either the buyer account data or a current GPS location of the buyer, that legally prohibit the sale of the one or more firearms to the buyer based on the buyer's location.

10. The method of claim 9, wherein the filtering of the one or more firearms from the master list is further based at least in part on:

firearm regulations associated with one or more legal jurisdictions associated with a location of the seller; or firearm regulations associated with one or more legal jurisdictions associated with a current location of the firearm held by the federally licensed firearm dealer.

11. The method of claim 9, wherein the filtering of the one or more firearms from the master list is further based on a classification of the buyer.

12. The method of claim 8, wherein the method further includes generating and displaying pricing data for the at least one available firearm, and wherein the pricing data includes a current market price as well as historical market pricing data associated with the firearm, the historical market pricing comprising an average market price at which firearms of the same type have been sold over time.

13. The method recited in claim 8, wherein the method further includes:

identifying and displaying one or more federally licensed firearm dealers that are determined to be geographically proximate the buyer based at least in part on a the location of the buyer;

receiving a buyer selection of a federally licensed firearm dealer from the one or more identified federally licensed firearm dealers through the one or more interfaces; and providing the selected federally licensed firearm dealer with information related to the firearm.

14. A method implemented by a server computing system for facilitating an online transaction of a firearm, wherein the server computing system includes a processor and memory storing instructions which, when executed, implement the method, and wherein the online transaction involves a seller selling the firearm to a buyer with the use of at least one computerized interface generated by the server, the method comprising:

the server creating and maintaining a seller account, the seller account being associated with data that identifies a location associated with the seller;

the server creating and maintaining a buyer account, the buyer account being associated with data that identifies a location associated with the buyer;

the seller creating a master list of firearms available for sale;

receiving seller firearm data corresponding to a particular firearm to be sold by the seller;

determining whether the seller is authorized to sell the particular firearm;

updating the master list of firearms available for sale periodically by adding new firearms for sale into the master list and by removing firearms from the master list that are no longer for sale, wherein said updating includes adding the particular firearm if it is determined the seller is authorized to sell the firearm;

displaying at least some of the firearms for sale to the buyer; and displaying a map that includes at least one of the buyer associated location or the seller associated location along with an identification of at least one federally licensed firearms dealer located on the map.

15. The method recited in claim 14, wherein displaying at least some of the firearms for sale to the buyer comprises creating and displaying a filtered list of firearms for sale to the buyer, wherein the filtered list omits at least some of the firearms included in the master list, and wherein the filtered list is created by excluding any firearms in the master list for which firearm restrictions of one or more legal jurisdictions corresponding to the location associated with the buyer prohibit the sale of the firearms to the buyer based on the buyer's location.

16. The method recited in claim 14, wherein the method further includes tracking historic market price data for at least the particular firearm and generating pricing data that is displayed with a description of the particular firearm.

17. The method recited in claim 14, wherein the seller comprises a federally licensed firearms dealer.

18. A method implemented by a server computing system for facilitating an online transaction of a firearm, wherein the server computing system includes a processor and memory storing instructions which, when executed, implement the method, and wherein the online transaction involves a seller selling the firearm to a buyer with the use of at least one computerized interface generated by the server, the method comprising:

the server providing one or more interfaces to the seller through which the seller provides seller account data including a location of the seller;

the server receiving the seller account data through the one or more interfaces and generating a seller account;

receiving seller firearm data corresponding to a firearm to be sold by the seller through the one or more interfaces, wherein the firearm data includes at least a description of a type of the firearm, as well as at least a condition of the firearm, and wherein the condition is selected from one of a plurality of predefined conditions specified by the server to the seller;

determining whether the seller is legally permitted to sell the firearm based on current firearm regulations corresponding to a jurisdiction of a location associated with the seller;

prior to adding the firearm to a database of firearms being sold via the server, receiving verification from a federally licensed firearm dealer that the firearm is in the possession of the federally licensed firearm dealer as well as a verification of the firearm data, including at least the condition of the firearm;

upon receiving the verification from the federally licensed firearm dealer and upon determining that the seller is legally permitted to sell the firearm, adding the firearm to a database of firearms being sold via the server;

the server providing one or more interfaces to the buyer through with the buyer provides buyer account data including a location of the buyer;

the server receiving the buyer account data through the one or more interfaces;

receiving a request from the buyer to view firearms being sold via the server; and displaying a subset of the firearms in the database wherein the subset is determined by filtering out one or more firearms that are included in the database when it is determined that the one or more firearms cannot legally be sold to the buyer based on firearm regulations corresponding to one or more legal jurisdictions of the buyer's location.

19. A method implemented by a server computing system for facilitating an online transaction of a firearm, wherein the server computing system includes a processor and memory storing instructions which, when executed, implement the method, and wherein the online transaction involves a seller selling the firearm to a buyer with the use of at least one computerized interface generated by the server, the method comprising:

the server providing one or more interfaces to the buyer through which the buyer provides buyer account data;

the server receiving the buyer account data through the one or more interfaces and generating a buyer account;

receiving a request to view firearms that are available for purchase;

identifying a master list of firearms available for purchase;

filtering one or more firearms from the master list based at least in part on firearm regulations associated with one or more legal jurisdictions associated with a location of the buyer, as determined by either the buyer account data or a current GPS location of the buyer, that legally prohibit the sale of the one or more firearms to the buyer based on the buyer's location; and displaying the filtered list of available firearms to the buyer including displaying firearm data with at least one of the available firearms displayed in the filtered list along with condition data wherein at least some of the firearm data including the condition of the firearm is initially specified through the one or more interfaces by a seller of the firearm and subsequently verified, prior to the firearm being listed on the master list, by a federally licensed firearm dealer to whom the firearm is delivered and wherein the method further includes receiving verification from the federally licensed firearm dealer indicating that the firearm is not stolen.

20. A method implemented by a server computing system for facilitating an online transaction of a firearm, wherein the server computing system includes a processor and memory storing instructions which, when executed, implement the method, and wherein the online transaction involves a seller selling the firearm to a buyer with the use of at least one computerized interface generated by the server, the method comprising:

the server providing one or more interfaces to the seller through which the seller provides seller account data including a location of the seller;

the server receiving the seller account data through the one or more interfaces and generating a seller account;

receiving seller firearm data corresponding to a firearm to be sold by the seller through the one or more interfaces;

prior to adding the firearm to a database of firearms being sold via the server, determining whether the seller is legally permitted to sell the firearm based on current firearm regulations corresponding to a jurisdiction of a location associated with the seller;

prior to adding the firearm to the database of firearms being sold via the server, determining whether the firearm is not stolen by accessing the National Instant Criminal Background Check System (NICS) to compare the firearm to firearms identified in the NICS as being stolen;

upon determining that the seller is legally permitted to sell the firearm and that the firearm is not stolen, adding the firearm to the database of firearms being sold via the server;

the server providing one or more interfaces to the buyer through with the buyer provides buyer account data including a location of the buyer;

the server receiving the buyer account data through the one or more interfaces;

receiving a request from the buyer to view firearms being sold via the server; and displaying at least some of the firearms in the database to the buyer.

* * * * *